United States Patent [19]

Spector

[11] Patent Number: 5,505,121
[45] Date of Patent: Apr. 9, 1996

[54] COMPOSITE CUP STAND AND OVEN UNIT

[76] Inventor: Donald Spector, 380 Mountain Rd., Union City, N.J. 07080

[21] Appl. No.: 352,923

[22] Filed: Dec. 9, 1994

[51] Int. Cl.$^6$ .................................................. A47G 23/04
[52] U.S. Cl. .............................. 99/290; 99/467; 99/483; 126/400; 248/146; 65/902
[58] Field of Search ........................ 99/290, 467, 483, 99/323.3; 206/541, 542, 545, 524.6; 126/400, 204, 205, 207; 248/146, 346.1; 165/902, 903, 10

[56] References Cited

U.S. PATENT DOCUMENTS

| 4,182,405 | 1/1980 | Hysen et al. | 165/902 |
| 4,446,916 | 5/1984 | Hayes | 165/902 |
| 4,890,807 | 1/1990 | Desjardins | 248/146 |
| 5,052,369 | 10/1991 | Johnson | 126/400 |

*Primary Examiner*—David Scherbel
*Assistant Examiner*—Reginald L. Alexander
*Attorney, Agent, or Firm*—Michael Ebert

[57] ABSTRACT

A composite stand and oven unit adapted to act both as a supporting stand for a cup of coffee or other hot beverage, and as a miniature oven to warm a bagel or other food product normally eaten while drinking the beverage. The unit is formed by a thermally-insulated cylindrical container having an access door in its side wall to receive the food product and a top wall of high thermal conductivity functioning as a heat sink. When a food product at room temperature is placed within the container and a cup of hot beverage, whose temperature is elevated, is seated on the heat sink, thermal energy from the beverage is absorbed by the sink and rapidly transferred to the food product. As a consequence, the temperature of the hot beverage is somewhat lowered to an acceptable drinking level while that of the food product is raised to render the product more palatable.

7 Claims, 1 Drawing Sheet

COMPOSITE CUP STAND AND OVEN UNIT

BACKGROUND OF INVENTION

1. Field of Invention

This invention relates generally to a stand for supporting a cup of coffee or other hot beverage, and in particular to a composite stand and oven unit which acts both as a stand for the cup of hot beverage and as a miniature oven to warm and render more palatable a food product that normally is eaten while drinking the beverage.

2. Status of Prior Art

In this era of fast food, the breakfast of most Americans is what is referred to in Europe as a continental breakfast. It consists of no more than a cup of hot coffee or tea and a roll, bagel, muffin, a piece of pastry or other food product which is normally eaten in conjunction with a hot beverage.

When freshly-prepared hot coffee is poured into a cup, it is usually piping hot and too hot to drink. Hence one must wait for the coffee to cool to an acceptable drinking temperature which will not scald the mouth of the drinker. On the other hand, a bagel, a muffin or other food product is normally served at room temperature and at this temperature the food product is not as tasty or as palatable as when it is warmed. Hence it is often the practice to place the food product in an oven to warm it. But since the typical oven is designed to accommodate a large load of food, it takes a relatively long time to heat a small food product, for in order to heat this product, the entire volume of air in the oven must first be heated. To give an extreme example, if one places a peanut in a conventional oven, it may take a half hour before the peanut is hot.

The patent to Sarg U.S. Pat. No. 2,604,976 discloses a liquid container and a food container which can be separately filled, yet can be combined to fit together. The food container then serves to close the liquid container, for the bottom of the food container acts as a cover for the liquid container. But these containers are made of paper board and are not in heat exchange relationship.

The multiple vessel container unit shown in the Clubb U.S. Pat. No. 4,078,701 makes use of two vessels, one above the other in heat exchange relationship. Thus when ice cubes are placed in the lower container and the upper container is filled with liquid, the liquid is then cooled by the ice. The Paige et al. U.S. Pat. No. 5,086,926 shows a dual thermos in combination with a drinking cup and a compartment. But there is no heat exchange relationship between the two thermos bottles.

SUMMARY OF INVENTION

In view of the foregoing, the main object of this invention is to provide a composite cup stand and oven unit which supports a cup of hot beverage and at the same time acts as a miniature oven to warm a food product to be eaten when drinking the beverage; hence by the time the hot beverage cooled to a degree at which at can be imbibed, the food product is then sufficiently warmed to be eaten.

A significant feature of a unit in accordance with this invention is that the heat dissipated while the hot beverage is cooling to an acceptable drinking level is transferred to the food product to render it warm and more palatable.

Also an object of the invention is to provide a unit of the above type which can be mass produced at low cost.

Briefly stated, these objects are attained in a composite stand and oven unit adapted to act both as a supporting stand for a cup of coffee or other hot beverage, and as a miniature oven to warm a bagel or other food product normally eaten while drinking the beverage. The unit is formed by a thermally-insulated cylindrical container having an access door in its side wall to receive the food product and a top wall of high thermal conductivity functioning as a heat sink.

When a food product at room temperature is placed within the container and a cup of hot beverage, whose temperature is elevated, is seated on the heat sink, thermal energy from the beverage is absorbed by the sink and rapidly transferred to the food product. As a consequence, the temperature of the hot beverage is somewhat lowered to an acceptable drinking level while that of the food product is raised to render the product more palatable.

BRIEF DESCRIPTION OF DRAWINGS

For a better understanding of the invention as well as other objects and features thereof, reference is made to the following detailed description to be read in conjunction with the annexed drawings wherein.

DESCRIPTION OF INVENTION

Figure 1:
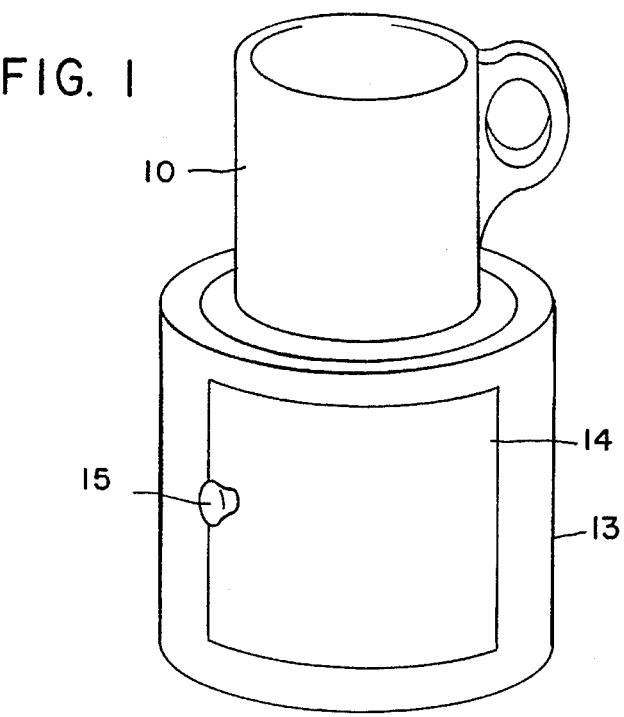
FIG. 1 is a perspective view of a composite stand and oven unit in accordance with the invention.
Figure 2:
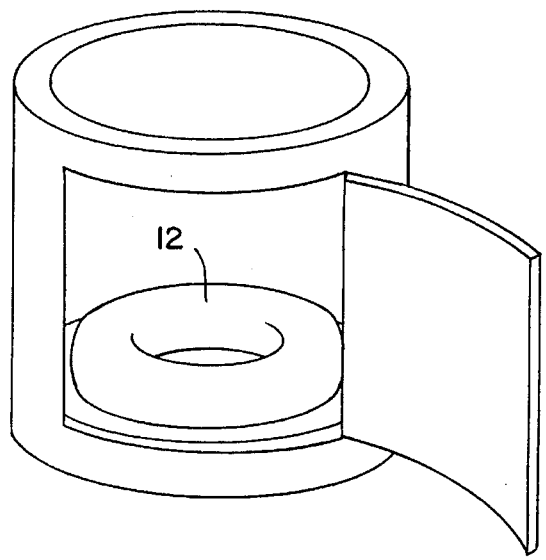
FIG. 2 illustrates the unit with its side door open to permit a food product to be placed therein.
Figure 3:
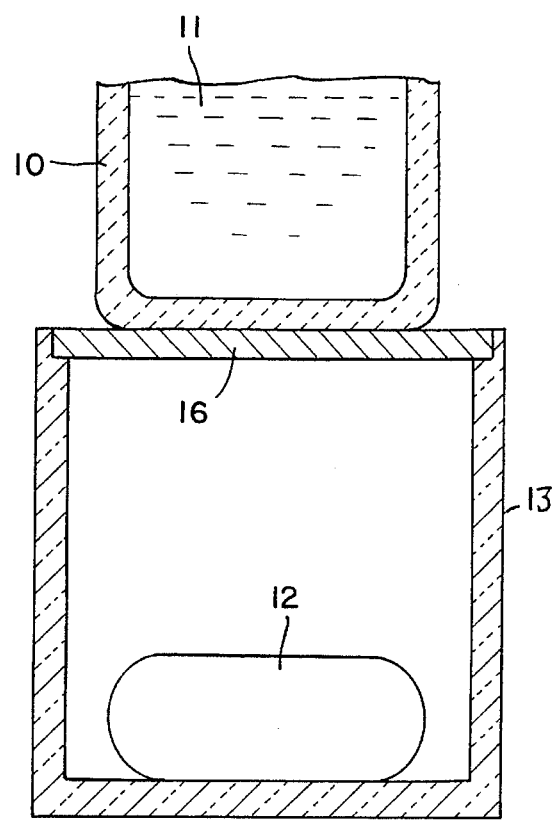
FIG. 3 is a section taken through the unit showing the heat transfer relationship between the hot beverage in the cup on the stand and the food product placed in the oven.

Referring now to the FIGS. 1 to 3, a composite stand and oven unit in accordance with the invention is adapted to act both as a stand for a cup 10 filled with coffee or other hot beverage 11, and as a miniature oven to warm a bagel 12 or other food product such as a muffin or pastry that is normally eaten when drinking the hot beverage.

The unit is formed by a cylindrical container 13 fabricated of a food grade synthetic plastic material such as polyethylene, a glazed ceramics, or other material having good thermal insulation properties. Or the container may be of double-wall synthetic plastic construction with a foam plastic core sandwiched between the walls, such as a container used for so called commuter mugs for coffee.

The side wall of container 13 is provided with a hinged door 14 made of the same material as the container, so that the door has thermal insulation properties. Door 14 is provided with a knob 15 so that it can be opened and closed to admit the food product 12 into the interior of the container which now functions as a miniature oven. The diameter of the container is such as to accommodate a bagel or other food product having a similar diameter, whereas the height of the container need be no greater than four inches.

The flat top wall of cylindrical container 13 is constituted by a relatively thick circular metal disc 16 nested in the circular side wall and acting as a heat sink. The metal for this purpose is preferably copper, stainless steel, or an alloy capable of absorbing heat from an object in thermal contact therewith. Container 13 serves as a stand to support cup 10 which rests on the heat sink 16.

Because the base of cup 10 is in contact with heat sink 16 and all other parts of the cup are in contact with the atmosphere, heat energy from hot beverage 11 in the cup is rapidly absorbed by the heat sink. This action serves to reduce the temperature of the beverage, the longer the cup rests on the heat sink, the greater being the reduction of beverage temperature. When the cup is first placed on the stand, the beverage therein is piping hot, and too hot to drink. The stand therefore acts to lower the beverage temperature somewhat to an acceptable non-scalding drinking level.

Heat sink 16 which absorbs thermal energy from the hot beverage, transfers this energy into the interior atmosphere of the container where it is absorbed by the bagel or other food product confined in the container. Thus the container which has a small interior volume also functions as a miniature oven which heats up rapidly.

Because the temperature on the outer face of the heat sink on which the cup rests is relatively high and that on the inner face of the sink in contact with the interior atmosphere of the container is relatively low, this heat differential promotes the rapid transfer of heat from the beverage to the food product.

Thus the unit carries out several functions, for while serving in place of a saucer as a stand supporting a cup of hot beverage, it also acts to reduce the temperature of the beverage to an acceptable drinking level. And at the same time it functions to warm the food product so that it is more palatable when eaten while drinking the somewhat cooled beverage.

While there has been shown a preferred embodiment of a composite unit in accordance with the invention, it is to be understood that many changes may be made thereon without departing from the spirit of the invention. Thus instead of a hinged access door, the door may simply be an arcuate rectangular segment of the side wall of the container which neatly fits into this side wall and can be removed therefrom by a handle or by finger indentations in the segment. Also instead of a cup, one may place a bowl of hot soup on the heat sink and warm the crackers to be eaten with the soup in the miniature oven.

I claim:

1. A composite stand and oven unit adapted to serve as a stand supporting a cup having a hot beverage therein and as a miniature oven to warm a food product normally eaten while drinking the beverage, said unit comprising:

A. thermally-insulated cylindrical container having a side wall closure to provide access to the interior of the container whereby the food product to be warmed may be placed in the container which functions as a miniature oven, said container including a top wall of high thermal conductivity functioning as a heat sink whereby when the cup is rested thereon, thermal energy from the hot beverage is absorbed by the heat sink and rapidly transferred to the food product within the container.

2. A unit as set forth in claim 1, in which the container is fabricated of food grade synthetic plastic material.

3. A unit as set forth in claim 1, in which the container is fabricated of ceramic material.

4. A unit as set forth in claim 1, in which the heat sink is formed of copper.

5. A unit as set forth in claim 1, in which the heat sink is formed of stainless steel.

6. A unit as set forth in claim 1, in which said closure is a door hinged to the side wall of the container and provided with a knob.

7. A unit as set forth in claim 1, in which the closure is an arcuate, rectangular segment of the side wall which is removable therefrom to provide access to the interior of the container.

\* \* \* \* \*